(12) United States Patent
Ohuchi et al.

(10) Patent No.: US 8,155,795 B2
(45) Date of Patent: Apr. 10, 2012

(54) DEMAND CONTROL SYSTEM, DEMAND CONTROLLER, DEMAND PROGRAM, AND DEMAND CONTROLLING METHOD

(75) Inventors: Atsushi Ohuchi, Takatsuki (JP); Tsuyoshi Kawaai, Uji (JP)

(73) Assignee: SANYO Electric Co., Ltd., Moriguchi (JP)

( * ) Notice: Subject to any disclaimer, the term of this patent is extended or adjusted under 35 U.S.C. 154(b) by 131 days.

(21) Appl. No.: 12/530,591

(22) PCT Filed: Mar. 5, 2008

(86) PCT No.: PCT/JP2008/053985
§ 371 (c)(1),
(2), (4) Date: Mar. 11, 2010

(87) PCT Pub. No.: WO2008/111467
PCT Pub. Date: Sep. 18, 2008

(65) Prior Publication Data
US 2010/0204845 A1    Aug. 12, 2010

(30) Foreign Application Priority Data

Mar. 9, 2007 (JP) .................................. 2007-061061
Dec. 7, 2007 (JP) .................................. 2007-317609

(51) Int. Cl.
*G05B 19/00*    (2006.01)
(52) U.S. Cl. .......................... 700/291; 700/286; 700/295
(58) Field of Classification Search .................. 700/286, 700/291, 295
See application file for complete search history.

(56) References Cited

U.S. PATENT DOCUMENTS

| 4,916,328 | A  | * | 4/1990  | Culp, III      | 700/291 |
| 5,834,855 | A  | * | 11/1998 | Chiba          | 700/291 |
| 6,665,590 | B2 | * | 12/2003 | Harada et al.  | 700/291 |
| 2003/0158631 | A1 | * | 8/2003  | Masuda et al. | 700/291 |
| 2009/0018705 | A1 | * | 1/2009  | Ouchi et al.  | 700/291 |
| 2009/0234511 | A1 | * | 9/2009  | Ouchi et al.  | 700/291 |

FOREIGN PATENT DOCUMENTS

| JP | 2002027668 | 1/2002  |
| JP | 2002165361 | 6/2002  |
| JP | 2003274555 | 9/2003  |
| JP | 2004297854 | 10/2004 |
| JP | 2005086880 | 3/2005  |
| JP | 3731110    | 1/2006  |

OTHER PUBLICATIONS

International Search Report of PCT/JP2008/053985.
Written Opinion of the ISA of PCT/JP2008/053985.

* cited by examiner

*Primary Examiner* — Charles Kasenge
(74) *Attorney, Agent, or Firm* — NDQ&M Watchstone LLP

(57) ABSTRACT

A demand control system 1 according to the present invention includes a CPU 41 and a power database 45. The power database 45 stores actual data in a state where the actual data are classified according to environmental conditions, the actual data being based on a consumption integration value of power actually consumed by the power consuming device. The CPU 41 calculates a predicted integration value of power predicted to be consumed in the demand time period, by using contents stored in the power database 45 at a start or before the start of the current demand time period. Further, the CPU 41 lowers a power target value when the calculated predicted integration value falls below the power target value being a target value of the power to be consumed in the demand time period.

6 Claims, 12 Drawing Sheets

FIG. 3

| TIME | OUTSIDE AIR TEMPERATURE | POWER CONSUMPTION INTEGRATION VALUE |
|---|---|---|
| .... | ..... | ..... |
| 0 : 30 | 10.2 °C | 0.0 KWh |
| 0 : 31 | 10.1 °C | 3.6 KWh |
| 0 : 32 | 10.2 °C | 6.9 KWh |
| 0 : 33 | 10.3 °C | 10.5 KWh |
| .... | ..... | ..... |

FIG. 4

| NAME OF DEVICE | OPERATION STATE | STOP PRIORITY | RESTART PRIORITY | ESTIMATED REDUCED POWER |
|---|---|---|---|---|
| AIR CONDITIONER 1 | IN ABEYANCE | 1 | 4 | 0.12 KW |
| AIR CONDITIONER 2 | IN ABEYANCE | 2 | 3 | 0.11 KW |
| AIR CONDITIONER 3 | IN OPERATION | 3 | 2 | 0.16 KW |
| AIR CONDITIONER 4 | IN OPERATION | 4 | 1 | 0.13 KW |
| .... | ..... | .. | .. | ..... |

DEMAND CONTROL SYSTEM, DEMAND CONTROLLER, DEMAND PROGRAM, AND DEMAND CONTROLLING METHOD

TECHNICAL FIELD

The present invention relates to a demand control system, a demand controller, a demand program, and a demand controlling method.

BACKGROUND ART

An demand contract method is known as one of contract methods used for an electricity rate contract made between a shop or facility owner and a power company. In the demand contract method, a contract rate is determined in the following way. Specifically, an integration value of power consumption (hereinafter referred to as a power consumption integration value) is calculated for each predetermined time period (hereinafter referred to as a demand time period). Then, the contract rate is set based on the highest power consumption integration value among the power consumption integration values for the respective demand time periods in one year.

Here, the demand time period includes: time periods defined by a predetermined value such as 15 minutes or 30 minutes; time periods defined by a time zone set as having an increased amount of power consumption (12 to 2 o'clock, for example) and other time zones (2 to 4 o'clock, for example) according to the thus-set time zone; and time periods defined by time zones in which different electricity rates are applied. Shop or facility owners desire to keep the power consumption integration value for one demand time period at a low level.

To this end, demand control is performed. In the demand control, the power consumption integration value from a start to an end of a demand time period is predicted in the mid-course of the demand time period. Then, when the integration value thus predicted (hereinafter referred to a predicted integration value) exceeds a predetermined power target value, operation of a specific device is stopped. In general, the power target value is often set to a value equal to or below the highest power consumption integration value of the previous year. The power consumption integration value from the start to the end of the demand time period is conventionally predicted based on a linear predictive method.

The linear predictive method is performed based on the following arithmetic expression (1).

$$R = P + (\Delta p / \Delta t) \times Tn \quad (1),$$

where R: a predicted value of power consumption from the start of a demand time period to the end of the demand time period P: a power consumption integration value from the start of the demand time period to present time;

$\Delta p$: power consumption at sampling time;

$\Delta t$: sampling time; and

Tn: remaining time in the demand time period (time from the present time to the end of the demand time period).

In this method, however, if there is fluctuation of the value $\Delta p/\Delta t$, the predicted integration value R largely fluctuates as well. Particularly when the Tn has a large value, such fluctuation is apt to be significant. For this reason, in the conventional method, there is a possibility of adversely affecting the environment by stopping the operation of the device for a time longer than necessary or a possibility of causing the power consumption integration value to exceed contracted power by stopping the device at timing behind the optimal timing.

To address such a problem, there has been proposed an apparatus configured to register transitions of power consumption in respective demand time periods in a database in advance, to extract past data from the database, the past data indicating a transition of power consumption that is approximate to a transition of power consumption at sampling frequencies from the start to the present time in a current demand time period, and to predict a future power consumption transition from the extracted data (see Patent Document 1).

Meanwhile, apart from the foregoing, an apparatus for judging appropriateness of a power target value has been proposed. This apparatus is configured to detect and store a shutoff level attributable to demand control and duration of the shutoff level, then to calculate an accumulated time period of the shutoff durations in a predetermined period, and to determine the appropriateness of the power target value based on the accumulated time period thus calculated (see Patent Document 2).

Patent Document 1: JP-A 2002-27668
Patent Document 2: JP-B 3731110

DISCLOSURE OF THE INVENTION

However, according to the apparatus disclosed in Patent Document 1, the future transition is predicted by extracting the data indicating the approximate transition to the power consumption transition from the start of the demand time period to the present time. Therefore, approximation of the transition after the present time is not guaranteed at all. Accordingly, the predicted integration value is not always calculated with high accuracy.

Moreover, while the apparatus disclosed in Patent Document 2 determines the appropriateness of the power target value, the actual setting of the power target value has to be done by a user. For this reason, the contract rate may become high if the power target value is set too high as a result of failure to set up the power target value properly. In contrast, the environment may be deteriorated if the power target value is set too low.

In view of the foregoing problems, it is an object of the present invention to provide a demand control system, a demand controller, a demand program, and a demand controlling method, which are capable of improving accuracy of calculating a predicted integration value and optimizing a power target value.

The present invention provides a demand control system that controls power consumption of a power consuming device when a predicted integration value of power predicted to be consumed by the power consuming device in a demand time period exceeds a power target value being a target value for power to be consumed in the demand time period. The demand control system of the present invention includes: an actual data storage unit configured to store actual data in a state where the actual data are classified according to environmental conditions, the actual data being based on a consumption integration value of power actually consumed by the power consuming device; a calculator configured to calculate a predicted integration value predicted to be consumed in a current demand time period, by using the actual data at a start or before the start of the current demand time period, the actual data being based on a current actual environmental condition and extracted from storage contents stored by the actual data storage unit from the actual data storage unit; and a changing unit configured to change the power target value in the current demand time period, based on the predicted integration value calculated by the calculator and on the power target value.

According to the demand control system of the present invention, the predicted integration value predicted to be consumed in the current demand time period is obtained from the actual data being based on the current actual environmental condition out of the actual data based on the consumption integration value of power actually consumed by the power consuming device. When the power consuming device is an air conditioner, for example, power is consumed by executing operation according to the environment such as an outside air temperature. For this reason, accuracy of calculating the predicted integration value can be improved by obtaining the predicted integration value from the actual data being based on the environmental condition. Further, it is possible to optimize the value because the power target value in the current demand time period is changed based on the predicted integration value with the improved accuracy and on the power target value. Therefore, it is possible to improve accuracy of calculating the predicted integration value and to optimize the power target value.

In addition, in the demand control system of the present invention, it is preferable that the changing unit should lower the power target value from a current value when the predicted integration value calculated by the calculator falls below the power target value.

According to this demand control system, the power target value is lowered when the predicted integration value falls below the power target value. Hence, accumulating reduction in the power target value for each demand time period allows eventual reduction in a contract rate.

In addition, in the demand control system of the present invention, it is preferable that the calculator should calculate the predicted integration value in the current demand time period and calculate a predicted integration value in a subsequent demand time period from the actual data extracted from the actual data storage unit based on the current actual environmental condition, and that even in a case where the predicted integration value in the current demand time period calculated by the calculator falls below the power target value, the changing unit should not lower the power target value in the current demand time period if the predicted integration value in the subsequent demand time period exceeds the power target value.

According to this demand control system, even if the predicted integration value in the current demand time period falls below the power target value, the power target value in the current demand time period is not lowered when the predicted integration value in the subsequent demand time period exceeds the power target value. In this way, it is possible to prevent a situation where a burden is placed on the power consuming device in the subsequent demand time period to cause the power consumption integration value to exceed the power target value in the subsequent demand time period because of lowering the power target value in the current demand time period.

In addition, it is preferable that the demand control system of the present invention should further include a maximum power storage unit configured to store a highest integration value among the consumption integration values of power actually consumed in respective demand time periods in a current month, and that in a case where the predicted integration value in the current demand time period calculated by the calculator is equal to or below the power target value, the changing unit should change the power target value in the current demand time period to the predicted integration value if the predicted integration value exceeds the maximum integration value, and changes the power target value in the current demand time period to the maximum integration value if the predicted integration value is equal to or below the maximum integration value.

According to this demand control system, the power target value in the current demand time period is changed to the maximum integration value when the predicted integration value is equal to or below the maximum integration value. Here, in the demand contract method, the rate is set based on the maximum integration value. For this reason, the change of the power target value in the current demand time period to the value below the maximum integration value will not result in reduction in the contract rate. However, since the power target value is changed to the maximum integration value, it is possible to prevent the change of the power target value which does not result in reduction in the contract rate. Further, lowering the power target value to the maximum integration value makes it less likely that the maximum integration value is updated in the current month. This can contribute to eventual reduction in the contract rate.

In addition, in the demand control system of the present invention, it is preferable that when the consumption integration value of power actually consumed represents power consumed by the power consuming device under the control of the power consumption, the actual data storage unit should store as the actual data an integration value of power supposed to be consumed on the assumption that the power consumption is not controlled.

According to this demand control system, the power integration value supposed to be consumed on the assumption that the power consumption is not controlled is stored as the actual data. Hence it is possible to prevent the actual data from being inaccurate and causing degradation in accuracy of calculating the predicted integration value.

In addition, the present invention provides a demand controller that controls power consumption of a power consuming device when a predicted integration value of power predicted to be consumed by the power consuming device in a demand time period exceeds a power target value being a target value for power to be consumed in the demand time period. The demand controller of the present invention includes: an actual data storage unit configured to store actual data in a state where the actual data are classified according to environmental conditions, the actual data being based on a consumption integration value of power actually consumed by the power consuming device; a calculator configured to calculate a predicted integration value predicted to be consumed in a current demand time period, by using the actual data at a start or before the start of the current demand time period, the actual data being based on a current actual environmental condition and extracted from storage contents stored by the actual data storage unit; and a changing unit configured to change the power target value in the current demand time period, based on the predicted integration value calculated by the calculator and on the power target value.

According to this demand controller, the predicted integration value predicted to be consumed in the current demand time period is obtained from the actual data being based on the current actual environmental condition out of the actual data based on the consumption integration value of power actually consumed by the power consuming device. When the power consuming device is an air conditioner, for example, power is consumed by executing operation according to the environment such as an outside air temperature. For this reason, accuracy of calculating the predicted integration value can be improved by obtaining the predicted integration value from the actual data being based on the environmental condition. Further, it is possible to optimize the value because the power target value in the current demand time period is changed based on the predicted integration value with the improved accuracy and on the power target value. Therefore, it is possible to improve accuracy of calculating the predicted integration value and to optimize the power target value.

In addition, the present invention provides a demand program for causing a demand controller to execute power consumption control of a power consuming device when a predicted integration value of power predicted to be consumed by the power consuming device in a demand time period exceeds a power target value being a target value for power to be consumed in the demand time period. The demand program of the present invention includes: an actual data storage step of storing actual data in a state where the actual data are classified according to environmental conditions, the actual data being based on a consumption integration value of power actually consumed by the power consuming device; a calculating step of calculating a predicted integration value predicted to be consumed in a current demand time period, by using the actual data at a start or before the start of the current demand time period, the actual data being based on a current actual environmental condition and extracted from storage contents stored in the actual data storage step; and a changing step of changing the power target value in the current demand time period, based on the predicted integration value calculated in the calculating step and on the power target value.

According to the demand program of the present invention, the predicted integration value predicted to be consumed in the current demand time period is obtained from the actual data being based on the current actual environmental condition out of the actual data based on the consumption integration value of power actually consumed by the power consuming device. When the power consuming device is an air conditioner, for example, power is consumed by executing operation according to the environment such as an outside air temperature. For this reason, accuracy of calculating the predicted integration value can be improved by obtaining the predicted integration value from the actual data being based on the environmental condition. Further, it is possible to optimize the value because the power target value in the current demand time period is changed based on the predicted integration value with the improved accuracy and on the power target value. Therefore, it is possible to improve accuracy of calculating the predicted integration value and to optimize the power target value.

In addition, the present invention provides a demand controlling method of controlling power consumption control of a power consuming device when a predicted integration value of power predicted to be consumed by the power consuming device in a demand time period exceeds a power target value being a target value for power to be consumed in the demand time period. The demand controlling method of the present invention includes: an actual data storage step of storing actual data in a state where the actual data are classified according to environmental conditions, the actual data being based on a consumption integration value of power actually consumed by the power consuming device; a calculating step of calculating a predicted integration value predicted to be consumed in a current demand time period, by using the actual data at a start or before the start of the current demand time period, the actual data being based on a current actual environmental condition and extracted from storage contents stored in the actual data storage step; and a changing step of changing the power target value in the current demand time period, based on the predicted integration value calculated in the calculating step and on the power target value.

According to the demand controlling method of the present invention, the predicted integration value predicted to be consumed in the current demand time period is obtained from the actual data being based on the current actual environmental condition out of the actual data based on the consumption integration value of power actually consumed by the power consuming device. When the power consuming device is an air conditioner, for example, power is consumed by executing operation according to the environment such as an outside air temperature. For this reason, accuracy of calculating the predicted integration value can be improved by obtaining the predicted integration value from the actual data being based on the environmental condition. Further, it is possible to optimize the value because the power target value in the current demand time period is changed based on the predicted integration value with the improved accuracy and on the power target value. Therefore, it is possible to improve accuracy of calculating the predicted integration value and to optimize the power target value.

In the above description, the power is a concept including electrical energy.

According to the present invention, it is possible to improve accuracy of calculating a predicted integration value and to optimize a power target value.

BRIEF DESCRIPTION OF THE DRAWINGS

FIG. 2 is a schematic diagram showing storage contents to be stored by a power database shown in FIG. 1, in which FIG. 2(a) shows an example of environmental conditions and FIG. 2 (b) shows an example of actual data stored when a time zone is 0:30 to 0:40 and an outside air temperature is in a range from 5° C. to 10° C.

FIG. 3 is a schematic diagram showing storage contents to be stored by an operation state database shown in FIG. 1.

FIG. 4 is a schematic diagram showing storage contents to be stored by a stop/restart table shown in FIG. 1.

FIG. 5(b) shows the power target value after the change.

FIG. 12 is a view showing processing contents of a demand control system 3 according to a third embodiment, in which FIG. 12(a) shows an example of a state of power when the predicted integration value is equal to or below a maximum integration value, FIG. 12(b) shows an aspect of a change in the power target value in the case of FIG. 12(a), FIG. 12(c) shows an example of the state of power when the predicted integration value exceeds the maximum integration value, and FIG. 12(d) shows an aspect of a change in the power target value in the case of FIG. 12(c).

BEST MODES FOR CARRYING OUT THE INVENTION

Figure 1:
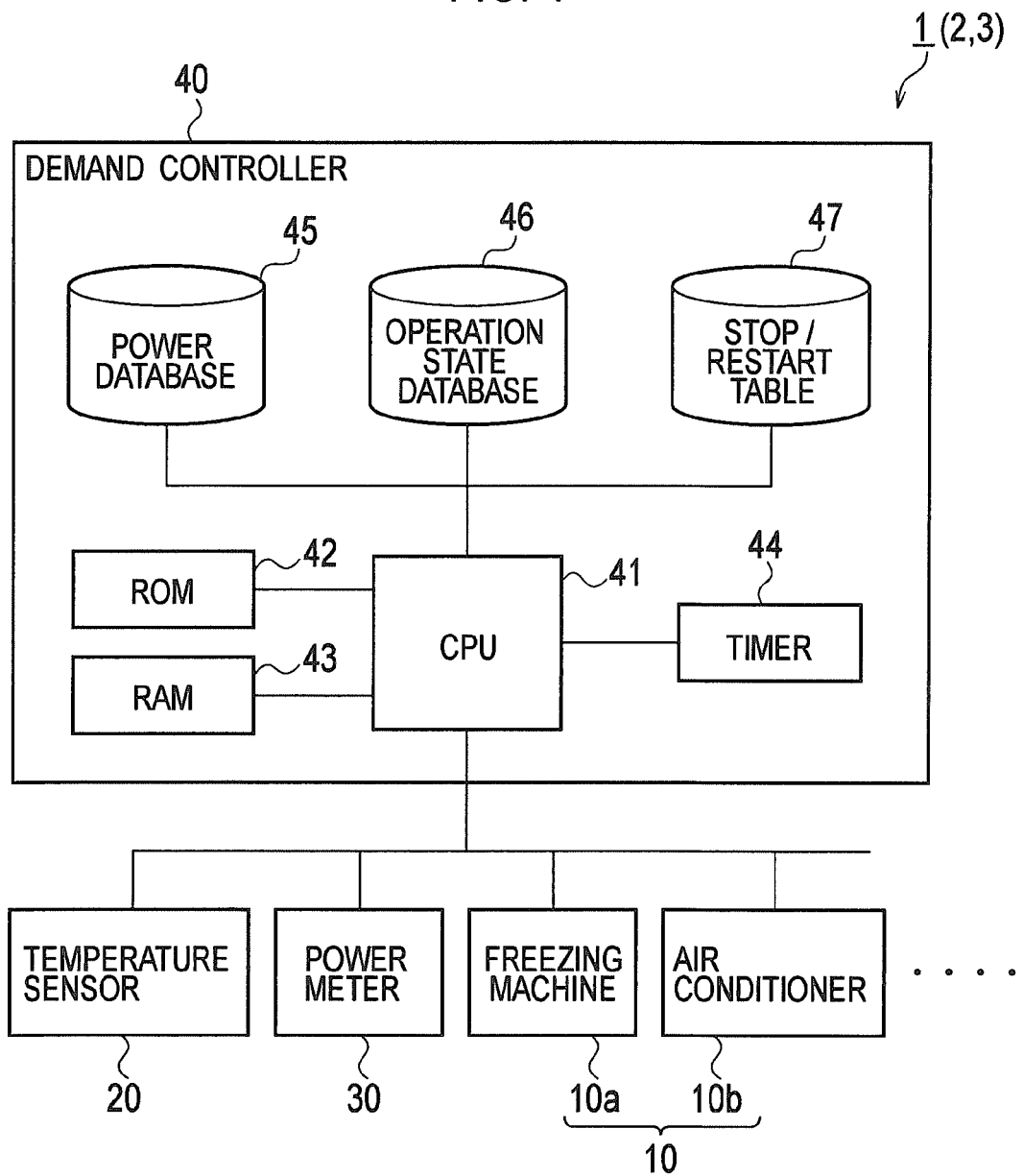
FIG. 1 is a schematic configuration diagram of a demand control system according to an embodiment.

Next, embodiments of the present invention will be described by using the drawings. FIG. 1 is a schematic configuration diagram of a demand control system according to an embodiment. As shown in FIG. 1, a demand control system 1 includes power consuming devices 10, a temperature sensor 20, a power meter 30, and a demand controller 40.

The power consuming devices 10 are devices that operate by consuming power, such as, for example, a freezing machine 10a and an air conditioner 10b. The temperature sensor 20 is configured to detect an outside air temperature. The power meter 30 is configured to detect power consumption by each of the power consuming devices 10. Here, the power consuming devices 10 are not limited to the foregoing devices and may be other devices such as lighting devices as long as they operate by consuming power. Moreover, it is also possible to provide one power consuming device 10 instead of a plural number.

The demand controller 40 is configured to control power consumption by the power consuming devices 10, and includes a CPU (a calculator and a changing unit) 41, a ROM 42, a RAM 43, a timer 44, a power database (an actual data storage unit) 45, an operation state database 46, and a stop/restart table 47.

The CPU 41 is configured to control the entire demand controller 40. For example, the CPU 41 is configured to calculate a predicted integration value of the power predicted to be consumed by the multiple power consuming devices 10 within a demand time period such as 30 minutes. Meanwhile, the demand controller 40 is configured to compare the predicted integration value thus calculated with a power target value which is a target value for the power to be consumed within the demand time period. When the predicted integration value exceeds the power target value, the demand controller 40 executes power consumption control such as stopping the power consuming devices 10.

The ROM 42 is configured to store control programs to be executed by the CPU 41, such as a program for calculating the above-described predicted integration value and a program for comparing the predicted integration value and the power target value. The RAM 43 is configured to store various parameters, and the like. The timer 44 has a timing function.

Figure 2:
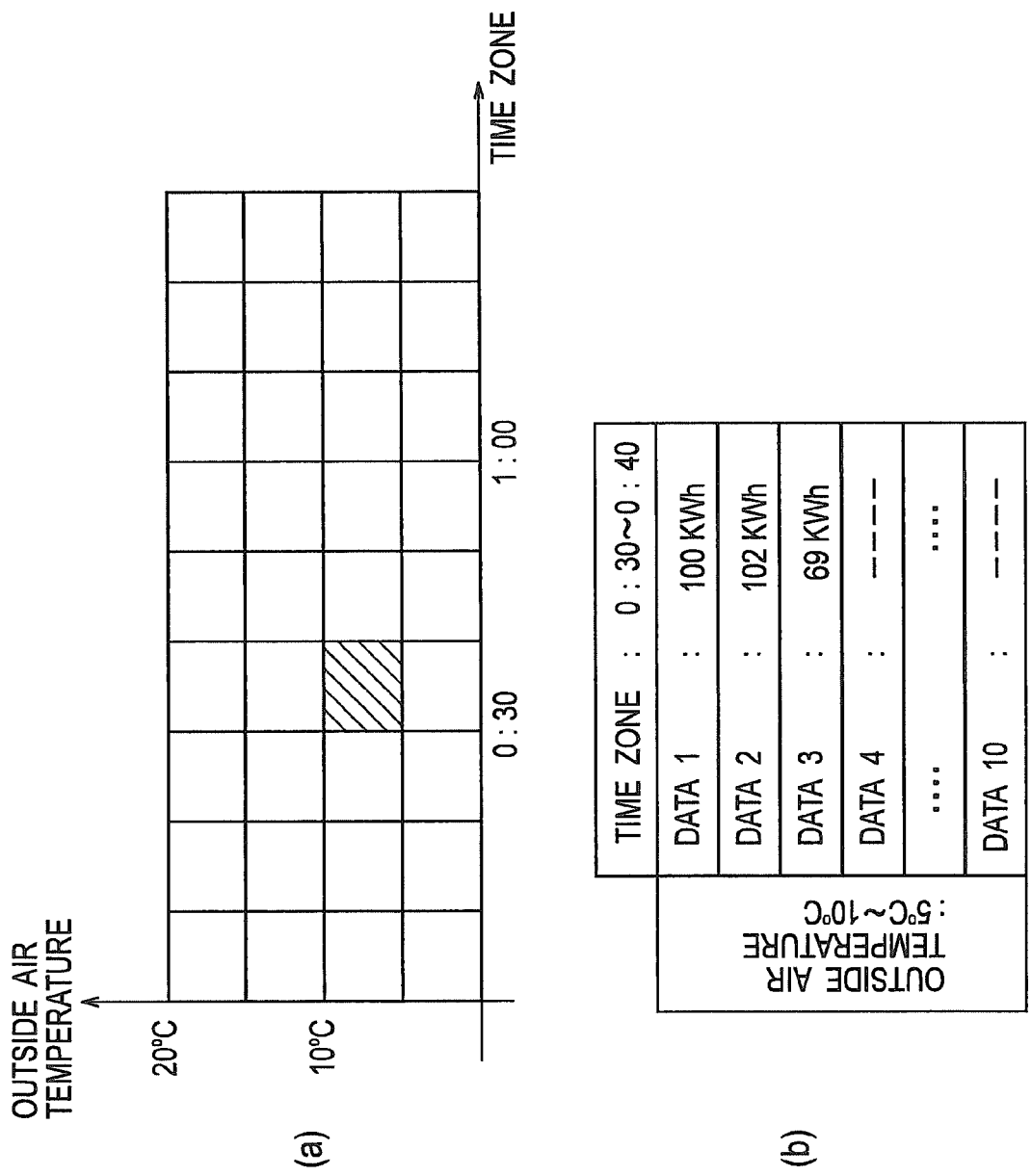

The power database 45 is configured to store actual data being based on the consumption integration values of power actually consumed by the power consuming devices 10. FIG. 2 is a schematic diagram showing storage contents stored by the power database 45 shown in FIG. 1. As shown in FIG. 2(a), environmental conditions include, for example, the outside air temperature to be detected by the temperature sensor 20 and time zones measured by the timer 44, and the actual data are classified and stored according to the outside air temperature and the time zone. Specifically, the actual data are distinctively stored in grids as shown in FIG. 2(a). The grids are sectioned by the outside air temperature at an interval of 5° C. and by the time zone at an interval of 10 minutes.

FIG. 2(b) shows an example of the actual data stored when the time zone is 0:30 to 0:40 and the outside air temperature is in the 5° C. to 10° C. range. As shown in FIG. 2(b), the power database 45 is configured to be able to store, for example, ten pieces of the actual data under the environmental condition where the time zone is 0:30 to 0:40 and the outside air temperature is in the 5° C. to 10° C. range. Meanwhile, when more than ten pieces of the actual data are obtained, the power database 45 is configured to delete sequentially from the oldest piece of the actual data. The same applies to other environmental conditions, for each of which ten pieces of new actual data are stored.

Refer to FIG. 1 again. The operation state database 46 is configured to save the integration values of power consumption from a start to an end of a demand time period. FIG. 3 is a schematic diagram showing storage contents stored by the operation state database 46 shown in FIG. 1. As shown in FIG. 3, the operation state database 46 is configured to store the outside air temperature and the power consumption integration value from the start of the demand time period (the time at 0:30 in FIG. 3) sequentially by the minute.

Refer to FIG. 1 again. The stop/restart table 47 is configured to store various pieces of information for each of the power consuming devices 10. FIG. 4 is a schematic diagram showing storage contents stored by the stop/restart table 47 shown in FIG. 1. As shown in FIG. 4, the stop/restart table 47 stores information on whether or not it is in abeyance or in operation, information on stop priorities, information on restart priorities, and information on estimated reduced power, for each of the power consuming devices 10.

Here, the stop priority indicates a priority of the power consuming device 10 for stopping the operation. The restart priority indicates a priority for starting the power consuming device 10 in abeyance. The estimated reduced power indicates the power which is estimated to be reduced by stopping the power consuming device 10 in operation. Here, the estimated reduced power indicates the power estimated to be reduced by stopping the power consuming device 10 for one minute. This estimated reduced power may be calculated from the past data on the power consumed by operating the power consuming device 10 or may be calculated from the rated power of the power consuming device 10.

Here, in this embodiment, the CPU 41 is configured to calculate the predicted integration value of the power predicted to be consumed in a current demand time period at the start of the current demand time period. For example, when the demand time period is sectioned by 30 minutes, the CPU 41 calculates the predicted integration value of the power predicted to be consumed from 0:30 to 1:00 at the time of 0:30. Similarly, the CPU 41 calculates the predicted integration value of the power predicted to be consumed from 1:00 to 1:30 at the time of 1:00, and calculates the predicted integration value of the power predicted to be consumed from 1:30 to 2:00 at the time of 1:30. Alternatively, the CPU 41 may be configured to calculate the predicted integration value of the power predicted to be consumed in the current demand time period before the start of the current demand time period. Now, in a first embodiment, an example is described in which the predicted integration value is calculated at the start of the current demand time period.

Moreover, the CPU 41 is configured to calculate the predicted integration value from the actual data extracted from the power database 45 based on the current actual environmental condition out of the storage contents stored by the power database 45. Specifically, when the current time is 0:30 and the temperature detected by the temperature sensor 20 is 7.5° C., the CPU 41 calculates the predicted integration value based on the actual data obtained at the 5° C. to 10° C. outside air temperature and in a 0:30 to 0:40 time zone, the actual data obtained at the 5° C. to 10° C. outside air temperature and in a 0:40 to 0:50 time zone, and the actual data obtained at the 5° C. to 10° C. outside air temperature and in a 0:50 to 1:00 time zone. Here, as shown in FIG. 2, ten pieces of the actual data are stored for each pair of the environmental conditions. Accordingly, the CPU 41 calculates the predicted integration value after calculating an average or the like of ten pieces of the actual data.

Figure 5:
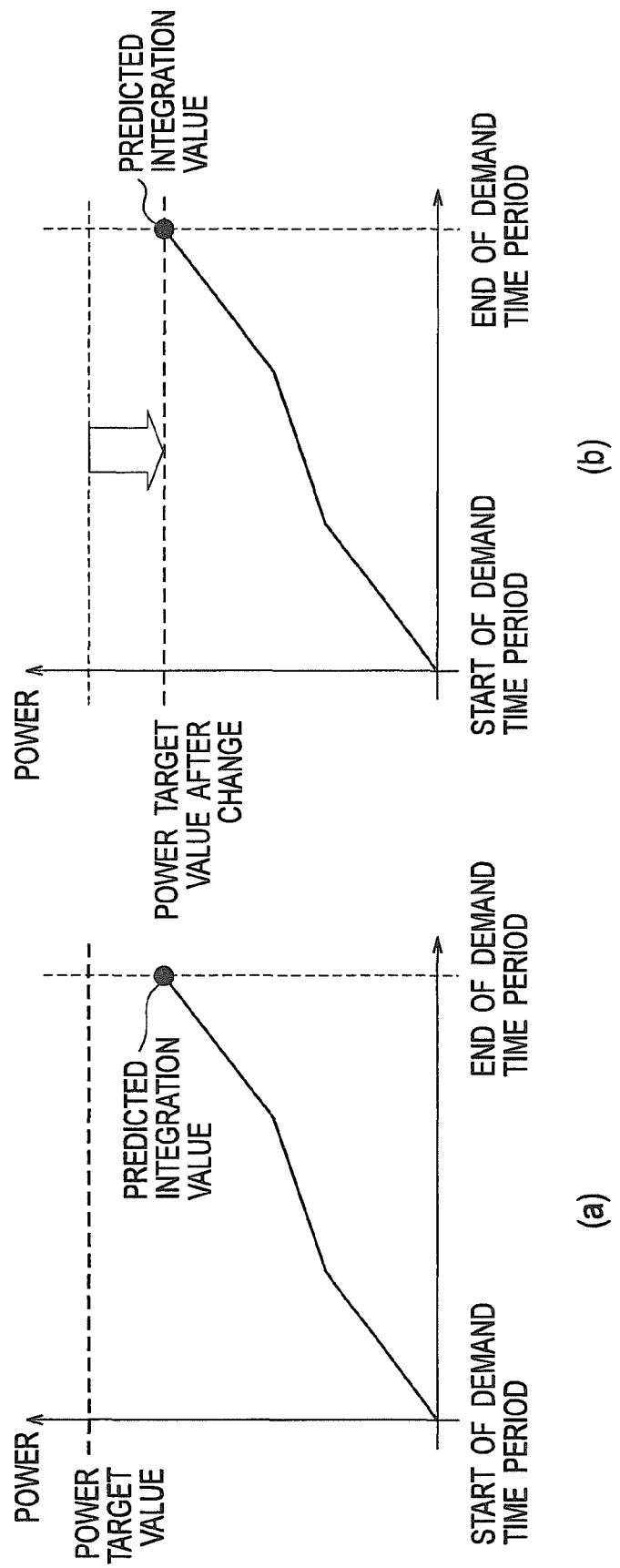
FIG. 5 is a view showing an aspect of a change in a power target value, in which FIG. 5 (a) shows a relation between the power target value and a predicted integration value

Further, the CPU 41 is configured to change the power target value in the current demand time period based on the predicted integration value thus calculated and on the power target value. FIG. 5 is a view showing how the power target value is changed. When the calculated predicted integration value falls below the power target value as shown in FIG. 5(*a*), the CPU 41 lowers the power target value in the current demand time period as shown in FIG. 5(*b*).

Figure 6:
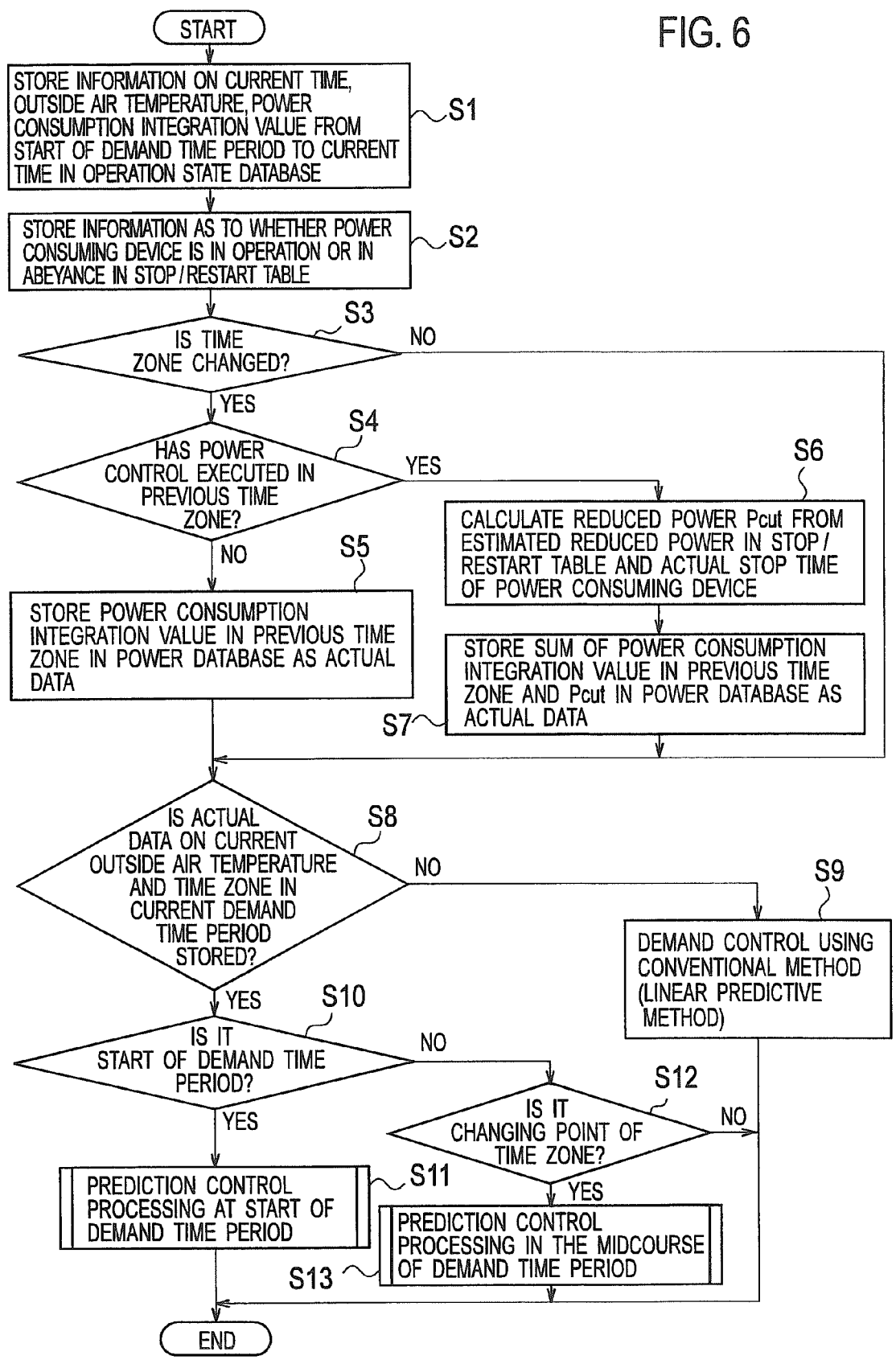
FIG. 6 is a flowchart showing a demand controlling method according to this embodiment.

Next, a demand controlling method by the demand control system 1 will be described. FIG. 6 is a flowchart showing the demand controlling method according to this embodiment. As shown in FIG. 6, the CPU 41 of the demand controller 40 firstly cause the operation state database 45 to store the information on the current time, the outside air temperature, and the consumption integrated values of power consumed from the start of the demand time period to the current time (step S1). Here, the processing in step S1 is assumed to be executed at an interval of one minute as shown in FIG. 3. However, the interval is not limited to one minute in particular.

Subsequently, the CPU 41 causes the stop/restart table 46 to store the information as to whether the power consuming device 10 is in operation or in abeyance (step S2). Thereafter, the CPU 41 determines whether or not the current time is a changing point of the time zone, which is one of the environmental conditions, based on time information measured by the timer 47 (step S3). The processing goes to step S8 when a determination is made that the current time is not the changing point of the time zone (step S3: NO).

On the other hand, when a determination is made that the current time is the changing point of the time zone (step S3: YES), the CPU 41 determines whether or not power control, i.e. the demand control has been carried out in the previous time zone (step S4). When a determination is made that the demand control has not been carried out (step S4: NO), the CPU 41 causes the power database 45 to store the power consumption integrated value in the previous time zone as the actual data (step S5). At this time, the CPU 41 stores the power consumption integrated value for a relevant pair of the environmental conditions. Thereafter, the processing goes to step S8.

Meanwhile, when a determination is made that the demand control has been carried out (step S4: YES), the CPU 41 calculates a reduced power Pcut by using the estimated reduced power in the stop/restart table 46 and the actual time for which the power consuming device 10 has been in abeyance (step S6). Thereafter, the CPU 41 causes the power database to store a sum of the power consumption integrated value in the previous time zone and the reduced power Pcut as the actual data (step S7). Thereafter, the processing goes to step S8.

In step S8, the CPU 41 determines whether or not the actual data representing the current outside air temperature and the time zone of the current demand time period are stored (step S8). When a determination is made that the above-described actual data are not stored (step S8: NO), the CPU 41 executes the demand control by utilizing a conventional method (the linear prediction method) (step S9). Then, the processing shown in FIG. 6 is terminated.

On the other hand, when a determination is made that the above-described data are stored (step S8: YES), the CPU 41 determines whether or not the current time is at the start of the demand time period (step S10). When a determination is made that the current time is at the start of the demand time period (step S10: YES), the CPU 41 executes prediction control processing at the start of the demand time period (step S11). In this processing, when the predicted integration value exceeds the power target value, the CPU 41 executes control to reduce the power consumption by, for example, stopping the power consuming device 10. Meanwhile, in this processing, when the predicted integration value falls below the power target value, the CPU 41 performs control to lower the power target value. Then, the processing shown in FIG. 6 is terminated.

When a determination is made that the current time is not at the start of the demand time period (step S10: NO), the CPU 41 determines whether or not the current time is the changing point of the time zone (step S12). The processing shown in FIG. 6 is terminated when a determination is made that the current time is not the changing point of the time zone (step S12: NO).

On the other hand, when a determination is made that the current time is the changing point of the time zone (step S12: YES), the CPU 41 executes prediction control processing in the midcourse of the demand time period (step S13). In this processing, when the predicted integration value exceeds the power target value, the CPU 41 executes control to reduce the power consumption by, for example, stopping the power consuming device 10. Then, the processing shown in FIG. 6 is terminated. Note that the processing shown in FIG. 6 is repeatedly executed until a power source for the demand controller 40 is turned off.

Figure 7:
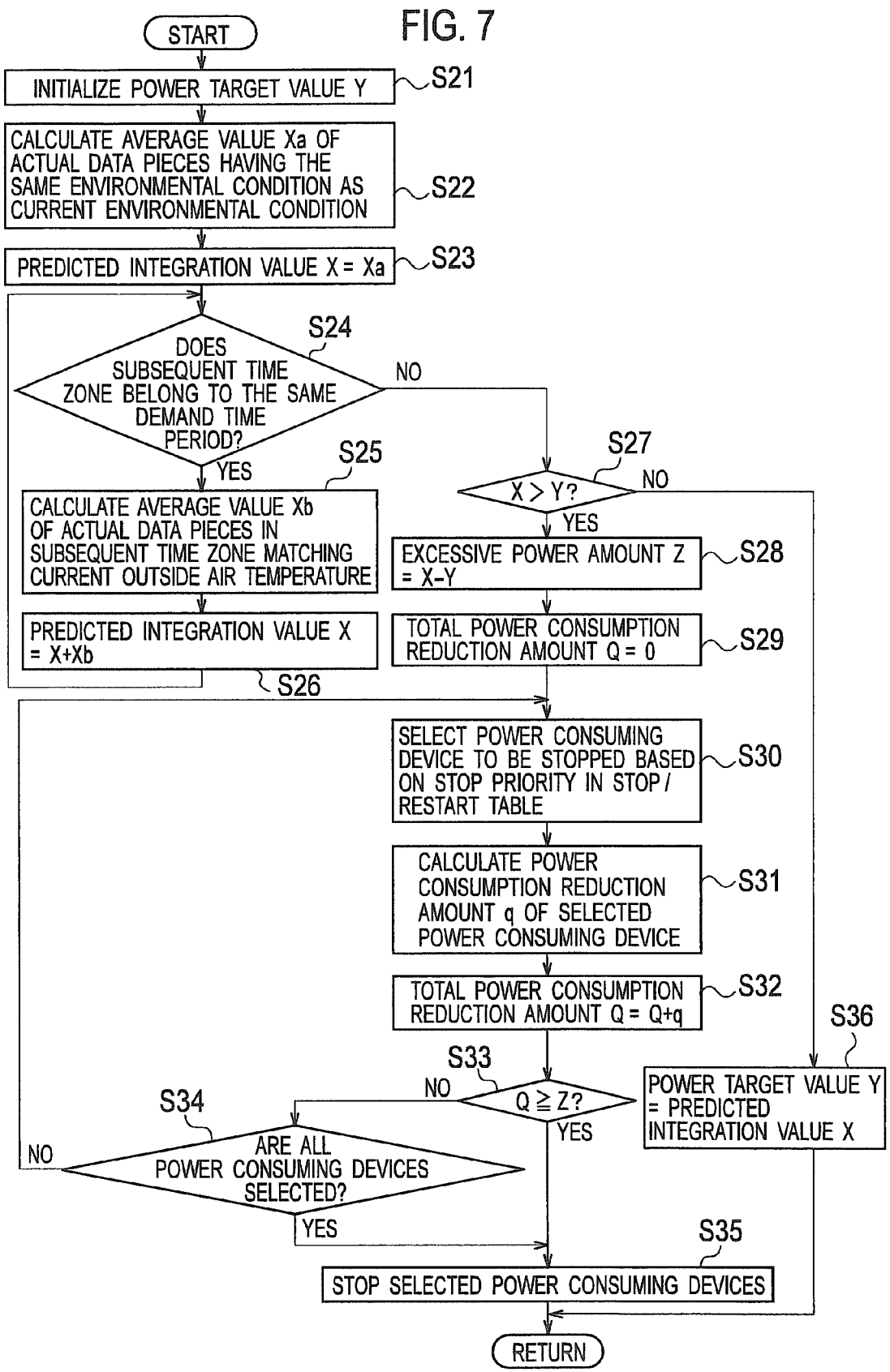
FIG. 7 is a flowchart showing details of prediction control processing (step S11) at a start of a demand time period shown in FIG. 6.

FIG. 7 is a flowchart showing details of the prediction control processing (step S11) performed at the start of the demand time period shown in FIG. 6. As shown in FIG. 7, the CPU 41 firstly performs initialization by setting a power target value Y to an initial value Yi (step S21). Thereafter, the CPU 41 calculates an average value Xa of the actual data pieces having the same environmental condition as the current environmental condition (step S22). Specifically, when the current outside air temperature is 7.5° C. and the time zone is 0:30, the CPU 41 reads ten pieces of the actual data representing the 5° C. to 10° C. outside air temperature and the 0:30 to 0:40 time zone, and calculates the average value Xa of those actual data.

Thereafter, the CPU 41 substitutes the average value Xa for a predicted integration value X (step S23). Then, the CPU 41 determines whether or not the subsequent time zone to the time zone for which the average value has been calculated belongs to the same demand time period (step S24). For example, if the average value for the 0:30 to 0:40 time zone is calculated, the subsequent time zone is 0:40 to 0:50. Hence, the CPU 41 determines that it belongs to the same demand time period. On the other hand, if the average value for the 0:50 to 1:00 time zone is calculated, the subsequent time zone is 1:00 to 1:10. Hence, the CPU 41 determines that it does not belong to the same demand time period.

When a determination is made that the subsequent time zone belongs to the same demand time period (step S24: YES), the CPU 41 calculates an actual data average value Xb based on the actual data for the subsequent time zone matching the current outside air temperature (step S25). Thereafter, the CPU 41 adds the average value Xb to the predicted integration value X (step S26). Then, the processing goes to step S24.

When a determination is made that the subsequent time zone does not belong to the same demand time period (step S24: NO), the CPU 41 determines whether or not the predicted integration value X exceeds the power target value Y (step S27). When a determination is made that the predicted integration value X exceeds the power target value Y (step S27: YES), the CPU 41 calculates an excessive power amount Z by subtracting the power target value Y from the predicted integration value X (step S28). Subsequently, the CPU 41 substitutes "0" for a total power consumption reduction amount Q (step S29).

Thereafter, the CPU 41 selects the power consuming device 10 to be stopped based on the stop priority in the stop/restart table 46 (step S30). Next, the CPU 41 calculates a power consumption reduction amount q from the estimated reduced power for the selected power consuming device 10 and the remaining time until the end of the demand time period (step S31). Then, the CPU 41 adds the power consumption reduction amount q calculated in Step S31 to the total power consumption reduction amount Q (step S32).

Thereafter, the CPU 41 determines whether or not the total power consumption reduction amount Q is equal to or above the excessive power amount Z (step S33). The processing goes to step S35 when a determination is made that the total power consumption reduction amount Q is equal to or above the excessive power amount Z (step S33: YES).

On the other hand, when a determination is made that the total power consumption reduction amount Q is lower than the excessive power amount Z (step S33: NO), the CPU 41 determines whether or not all the power consuming devices 10 are selected by way of the processing in step S30 (step S34). The processing goes to step S30 when a determination is made that all the power consuming devices 10 are not selected (step S34: NO). The processing goes to step S35 when a determination is made that all the power consuming devices 10 are selected (step S34: YES).

In step S35, the CPU 41 stops all the selected power consuming devices 10 (step S35). Thereafter, the processing goes to the flowchart shown in FIG. 6. Meanwhile, when a determination is made that the predicted integration value X does not exceed the power target value Y (step S27: NO), the CPU 41 changes the power target value Y into the value of the predicted integration value X (step S36). Then, the processing goes to the flowchart shown in FIG. 6.

Figure 8:
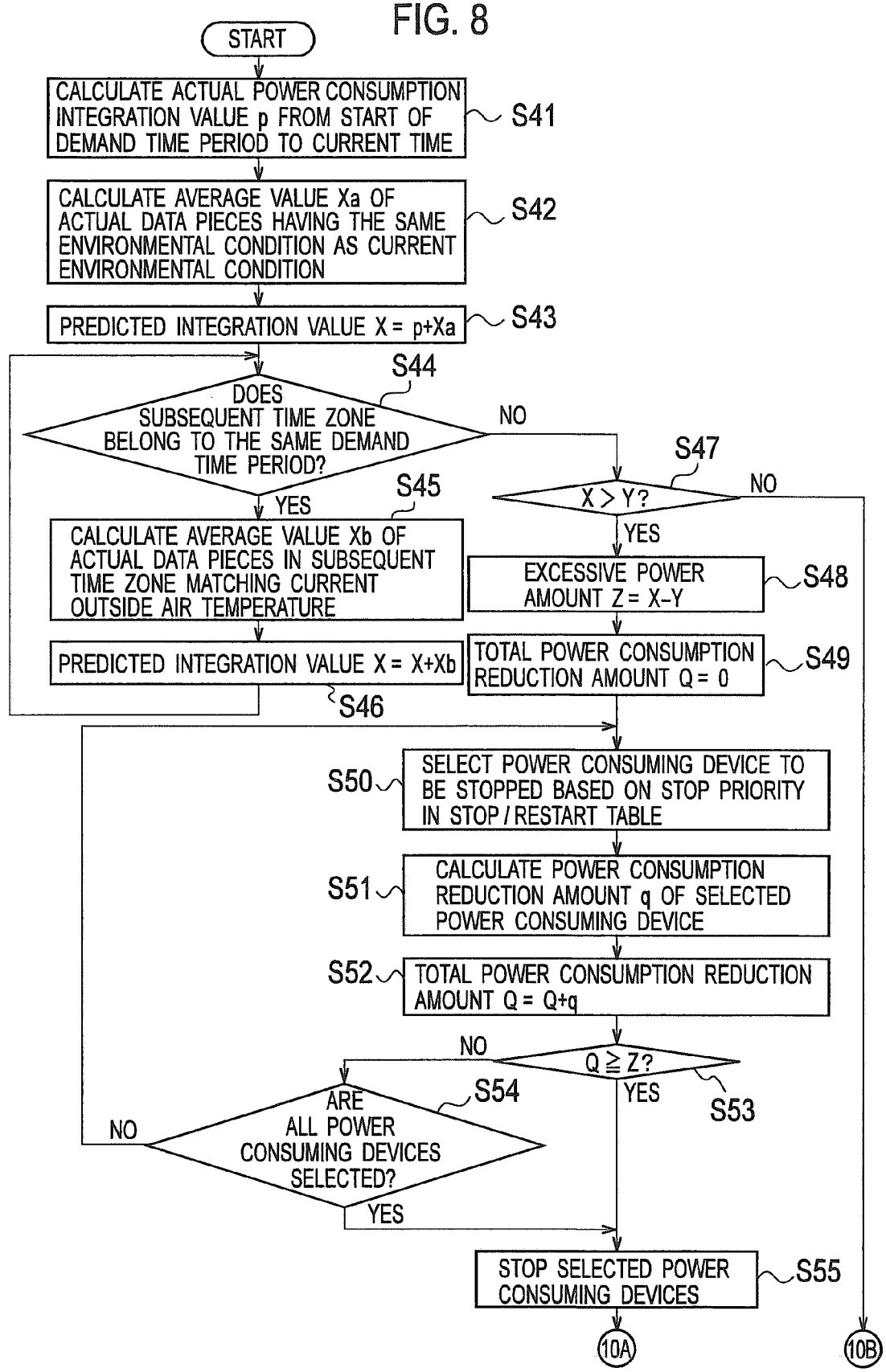
FIG. 8 is a flowchart showing details of prediction control processing (step S13) in the midcourse of the demand time period shown in FIG. 6, which shows a first half.
Figure 9:
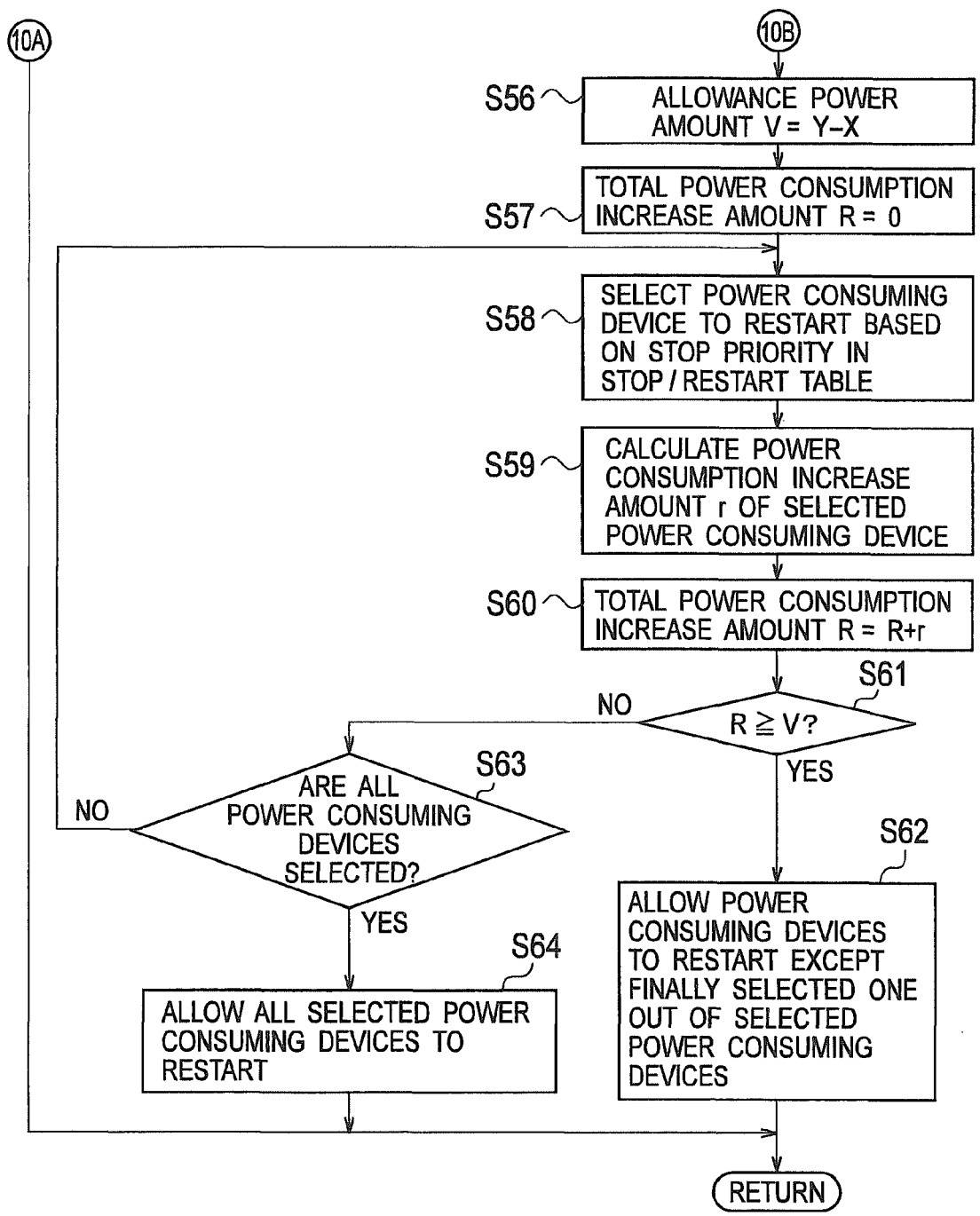
FIG. 9 is a flowchart showing details of the prediction control processing (step S13) in the midcourse of the demand time period shown in FIG. 6, which shows a last half.

FIGS. 8 and 9 are flowcharts showing details of the prediction control processing (step S13) shown in FIG. 6, performed in the midcourse of the demand time period. As shown in FIG. 8, the CPU 41 firstly calculates an actual power consumption integration value p from the start of the demand time period to the current time (step S41). Thereafter, the CPU 41 calculates the average value Xa of the actual data pieces having the same environmental condition as the current environmental condition (step S42).

Next, the CPU 41 sets a value obtained by summing up the actual power consumption integration value p from the start of the demand time period to the current time and the average value Xa as the predicted integration value X (step S43). Then, the CPU 41 determines whether or not the subsequent time zone to the time zone for which the average value has been calculated belongs to the same demand time period (step S44).

When a determination is made that the subsequent time zone belongs to the same demand time period (step S44: YES), the CPU 41 calculates the actual data average value Xb based on the actual data for the subsequent time zone matching the current outside air temperature (step S45). Thereafter, the CPU 41 adds the average value Xb to the predicted integration value X (step S46). Then, the processing goes to step S44.

When a determination is made that the subsequent time zone does not belong to the same demand time period (step S44: NO), the CPU 41 determines whether or not the predicted integration value X exceeds the power target value Y (step S47). The processing goes to step S48 when a determination is made that the predicted integration value X exceeds the power target value Y (step S47: YES). The processing from step S48 to step S55 is similar to the processing from step S28 to step S35 shown in FIG. 7, and description thereof will be omitted.

On the other hand, the processing goes to step S56 shown in FIG. 9 when a determination is made that the predicted integration value X does not exceed the power target value Y (step S47: NO). In step S56, the CPU 41 calculates an allowance power amount Y by subtracting the predicted integration value X from the power target value Y (step S56). Subsequently, the CPU 41 substitutes "0" for a total power consumption increase amount R (step S57).

Thereafter, the CPU 41 selects the power consuming device 10 to be restarted based on the restart priority on the stop/restart table 46 (step S58). Next, the CPU 41 calculates a power consumption increase amount r from the estimated reduced power for the selected power consuming device 10 and the remaining time until the end of the demand time period (step S59). Then, the CPU 41 adds the power consumption increase amount r calculated in Step S59 to the total power consumption increase amount R (step S60).

Thereafter, the CPU 41 determines whether or not the total power consumption increase amount R is equal to or above the allowance power amount V (step S61). When a determination is made that the total power consumption increase amount R is equal to or above the allowance power amount V (step S61: YES), the CPU 41 causes the selected power consuming devices 10 to restart, except the one selected finally (step S62). Thereafter, the processing goes to the flowchart shown in FIG. 6.

On the other hand, when a determination is made that the total power consumption increase amount R is not equal to or above the allowance power amount V (step S61: NO), the CPU 41 determines whether or not all the power consuming devices 10 are selected by way of the processing in step S58 (step S63). The processing goes to step S58 when a determination is made that all the power consuming devices 10 are not selected (step S63: NO). When a determination is made that all the power consuming devices 10 are selected (step S63: YES), the CPU 41 causes all the selected power consuming devices 10 to restart (step S64). Thereafter, the processing goes to the flowchart shown in FIG. 6.

As described above, according to the first embodiment, the predicted integration value predicted to be consumed in the current demand time period is obtained from the actual data based on the current actual environmental condition, out of the actual data based on the consumption integration value of power actually consumed by the power consuming device 10. For example, when the power consuming device 10 is the air conditioner 10b, the power is consumed by executing operation according to the environment such as the outside air temperature. For this reason, it is possible to improve accuracy of calculating the predicted integration value by obtaining the predicted integration value from the actual data based on the environmental condition. Further, it is possible to optimize the value because the power target value in the current demand time period is changed based on the predicted integration value with the improved accuracy and on the power target value. Therefore, it is possible to improve accuracy of calculating the predicted integration value and to optimize the power target value.

Moreover, the power target value is lowered when the predicted integration value falls below the power target value. Hence accumulating reduction in the power target value for each demand time period can contribute to eventual reduction in the contract rate.

Moreover, what is stored as the actual data is the power integration value supposed to be consumed on the assumption that the power consumption is not controlled. Hence it is possible to prevent the actual data from being inaccurate and causing degradation in accuracy of calculating the predicted integration value.

Next, a second embodiment of the present invention will be described. A demand control system according to the second embodiment is similar to, but different in the configuration and processing contents from, the one in the first embodiment. Now, the differences from the first embodiment will be described.

Figure 10:
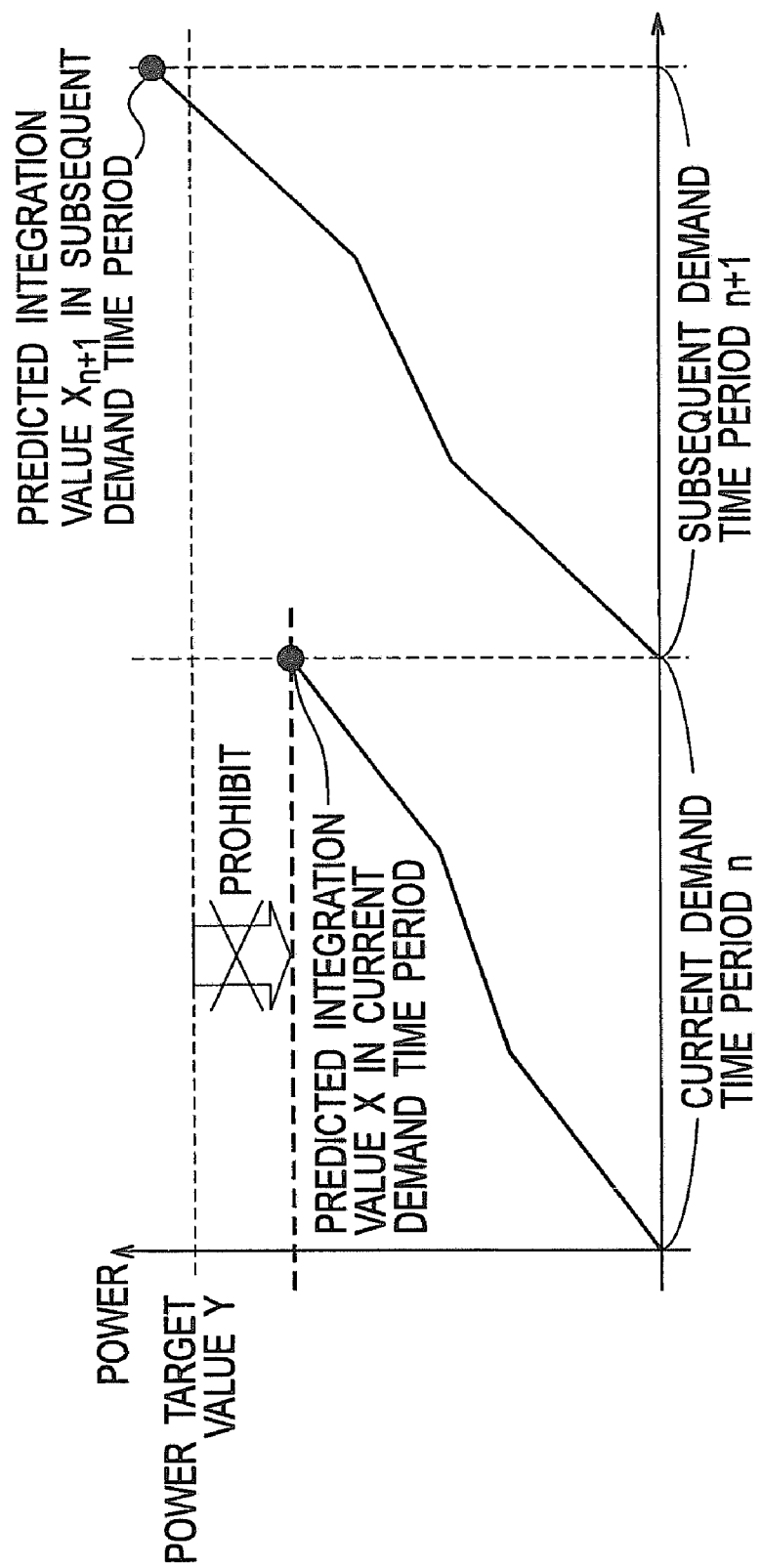
FIG. 10 is a view showing processing contents of the demand control system according to a second embodiment.

FIG. 10 is a view showing processing contents of a demand control system 2 according to the second embodiment. In the demand control system 2 according to the second embodiment, what the CPU 41 calculates at the start of the current demand time period is not only the predicted integration value X in the current demand time period, but also a predicted integration value $X_{n+1}$ at a start of the subsequent demand time period. Here, the CPU 41 according to the second embodiment may calculate the predicted integration value X in the current demand time period and the predicted integration value $X_{n+1}$ at the start of the subsequent demand time period, before the start of the current demand time period. Now, in the second embodiment, an example is described in which the predicted integration value X in the current demand time period and the predicted integration value $X_{n+1}$ at the start of the subsequent demand time period are calculated at the start of the current demand time period.

Further, assume a case where the calculated predicted integration value X in the current demand time period falls below the power target value Y, and the predicted integration value $X_{n+1}$ in the subsequent demand time period exceeds the power target value Y. In such a case, the CPU 41 does not lower the power target value Y in the current demand time period. Specifically, in the first embodiment, when the predicted integration value X falls below the power target value Y in the current demand time period, the power target value Y is changed to the same value as the predicted integration value X. However, in the second embodiment, the power target value Y is not changed because the predicted integration value $X_{n+1}$ exceeds the power target value Y.

Figure 11:
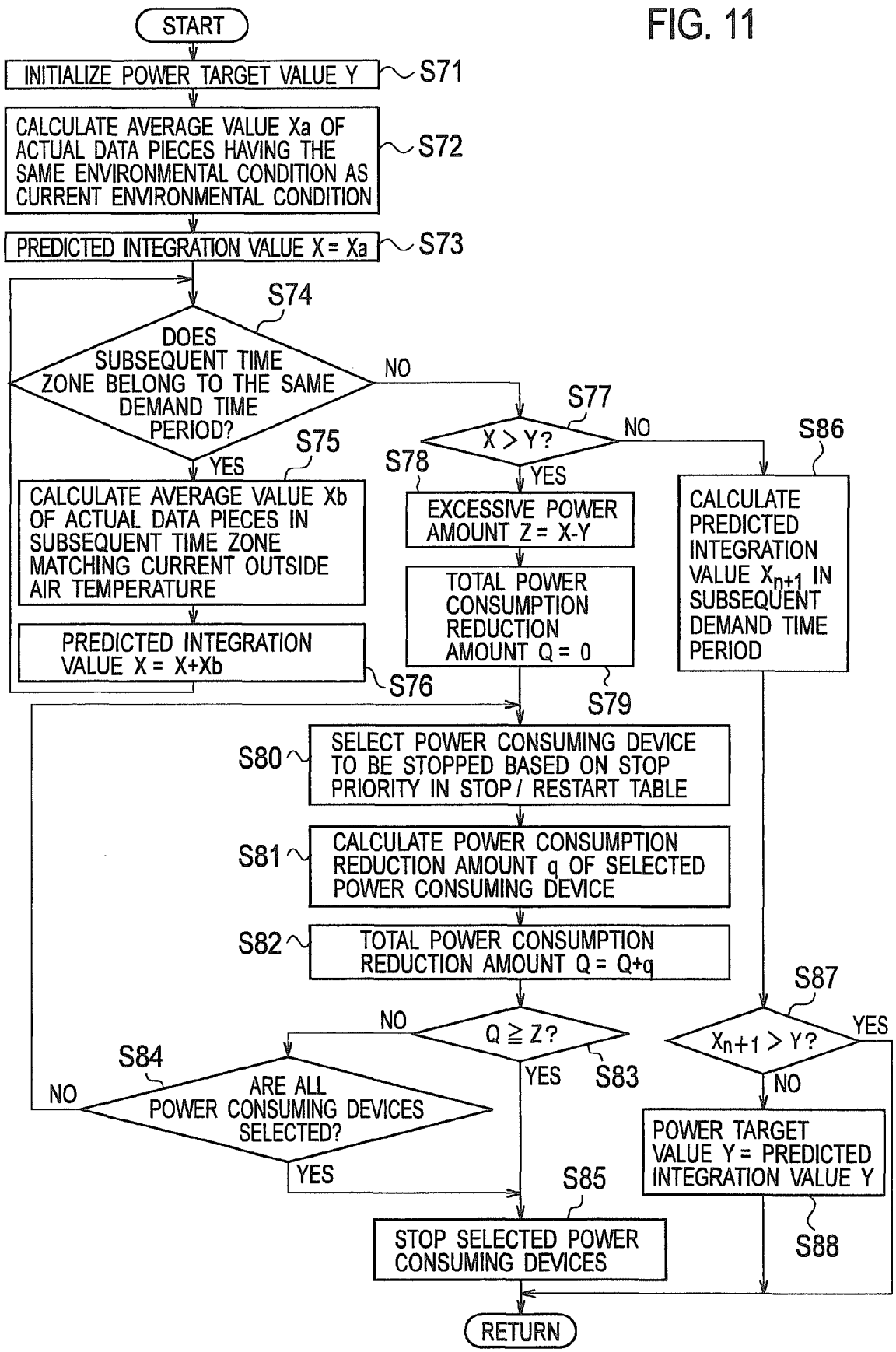
FIG. 11 is a flowchart showing the demand controlling method according to the second embodiment, which shows details of the prediction control processing (step S11) at the start of the demand time period shown in FIG. 6.

FIG. 11 is a flowchart showing the demand controlling method according to the second embodiment, and illustrates details of the prediction control processing (step S11) at the start of the demand time period shown in FIG. 6. Here, the processing from step S71 to step S85 shown in FIG. 11 is similar to the processing from step S21 to step S35 shown in FIG. 7, and description thereof will be omitted.

In step S77, when a determination is made that the predicted integration value X does not exceed the power target value Y (step S77: NO), the CPU 41 calculates the predicted integration value $X_{n+1}$ in the subsequent demand time period (step S86). The predicted integration value $X_{n+1}$ in the subsequent demand time period is calculated by the processing similar to step S72 to step S76.

Thereafter, the CPU 41 determines whether or not the predicted integration value $X_{n+1}$ in the subsequent demand time period exceeds the power target value Y (step S87).

When a determination is made that the predicted integration value $X_{n+1}$ in the subsequent demand time period does not exceed the power target value Y (step S87: NO), the CPU 41 substitutes the predicted integration value X for the power target value Y (step S36). Then, the processing goes to the flowchart shown in FIG. 6.

On the other hand, when a determination is made that the predicted integration value $X_{n+1}$ in the subsequent demand time period exceeds the power target value Y (step S87: YES), the processing goes to the flowchart shown in FIG. 6 without changing the power target value Y.

As described above, as in the first embodiment, the second embodiment allows improved accuracy of calculating the predicted integration value, optimized power target value, and eventual reduction in the contract rate. Moreover, it is possible to prevent the actual data from being inaccurate and causing degradation in accuracy of calculating the predicted integration value.

Further, according to the second embodiment, the power target value in the current demand time period is not lowered in a case where the predicted integration value in the subsequent demand time period exceeds the power target value and the predicted integration value in the current demand time period falls below the power target value. Here, in the first embodiment, the power target value is changed to the same value as the predicted integration value. However, changing the power target value to a smaller value than the predicted integration value, for example, would put a load on the power consuming device 10 in the subsequent demand time period. On the other hand, in the second embodiment, the power target value in the current demand time period is not lowered when the predicted integration value in the subsequent demand time period exceeds the power target value. Accordingly, it is possible to prevent a situation where a burden is placed on the power consuming device 10 in the subsequent demand time period to thereby cause the power consumption integration value to exceed the power target value in the subsequent demand time period.

Next, a third embodiment of the present invention will be described. A demand control system according to the third embodiment is similar to, but different in the configuration and processing contents from, the one in the first embodiment. Now, the differences from the first embodiment will be described.

In a demand control system 3 according to the third embodiment, the CPU 41 causes the RAM (a maximum power storage unit) 43 to store a maximum integration value among the consumption integration values of power actually consumed in respective demand time periods in a current month. Here, instead of the RAM 43, the CPU 41 may cause other storage media to store the value.

Figure 12:
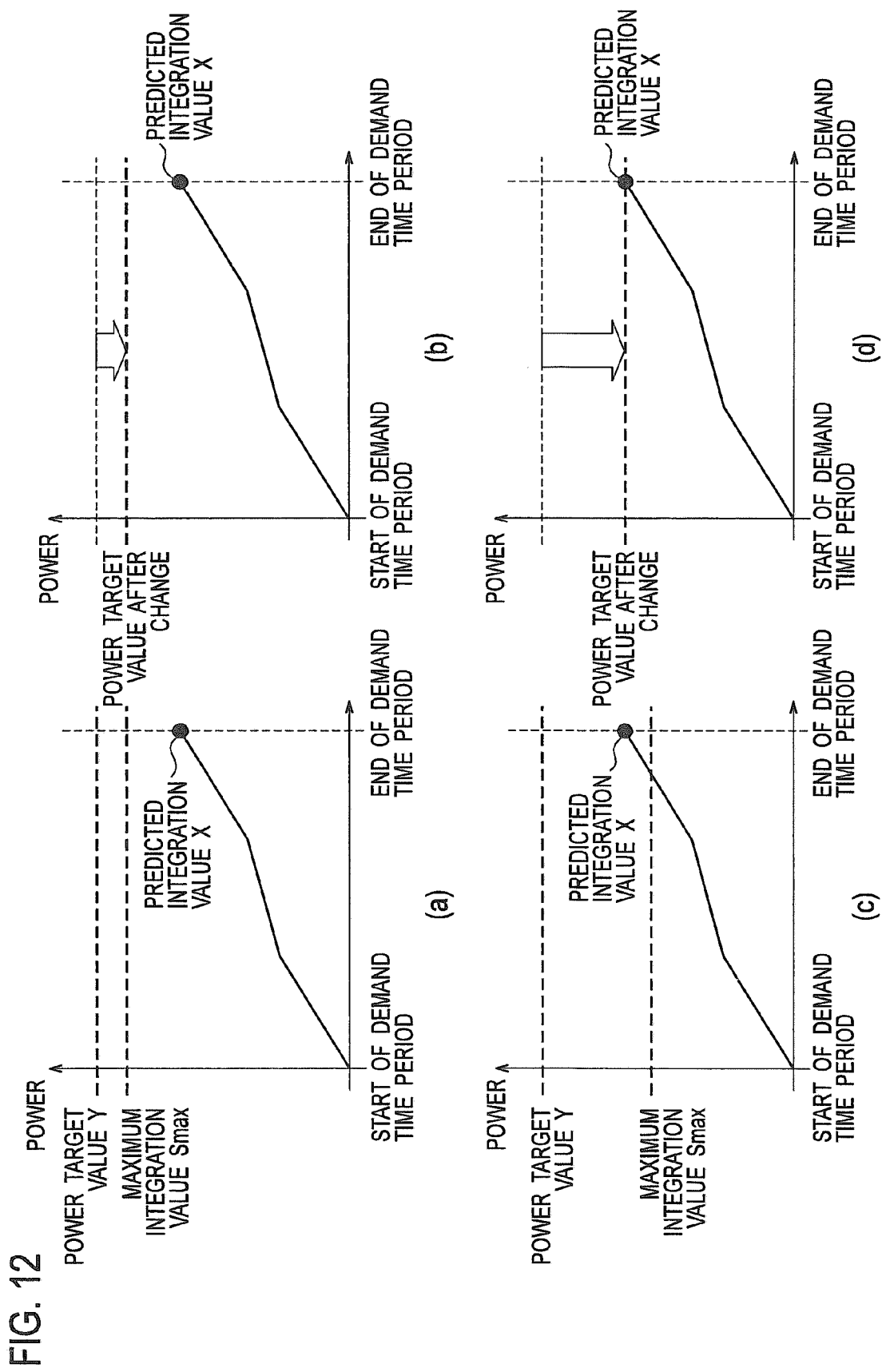

Moreover, the CPU 41 is configured to execute processing as shown in FIG. 12. FIG. 12 is a view showing processing contents of the demand control system 3 according to the third embodiment. FIG. 12(a) shows a case where the predicted integration value X in the current demand time period Y is equal to or below the power target value Y as well as being equal to or below a maximum integration value Smax. In this case, the CPU 41 changes the power target value Y in the current demand time period to the maximum integration value Smax (see FIG. 12(b)). Note that, in the demand contract method, the rate is set up based on the maximum integration value Smax. For this reason, change of the power target value Y in the current demand time period to the value below the maximum integration value Smax will not result in reduction in the contract rate. However, the power target value V is lowered to the maximum integration value Smax instead of being lowered to the predicted integration value X. Accordingly, it is possible to prevent the change of the power target value which does not result in reduction in the contract rate. Further, lowering the power target value Y to the maximum integration value Smax can make it less likely that the maximum integration value Smax is updated in the current month, allowing eventual reduction in the contract rate.

FIG. 12(c) shows a case where the predicted integration value X in the current demand time period is equal to or below the power target value Y and the predicted integration value X exceeds the maximum integration value Smax. In this case, the CPU 41 changes the power target value Y in the current demand time period to the predicted integration value X (see FIG. 12(d)).

Figure 13:
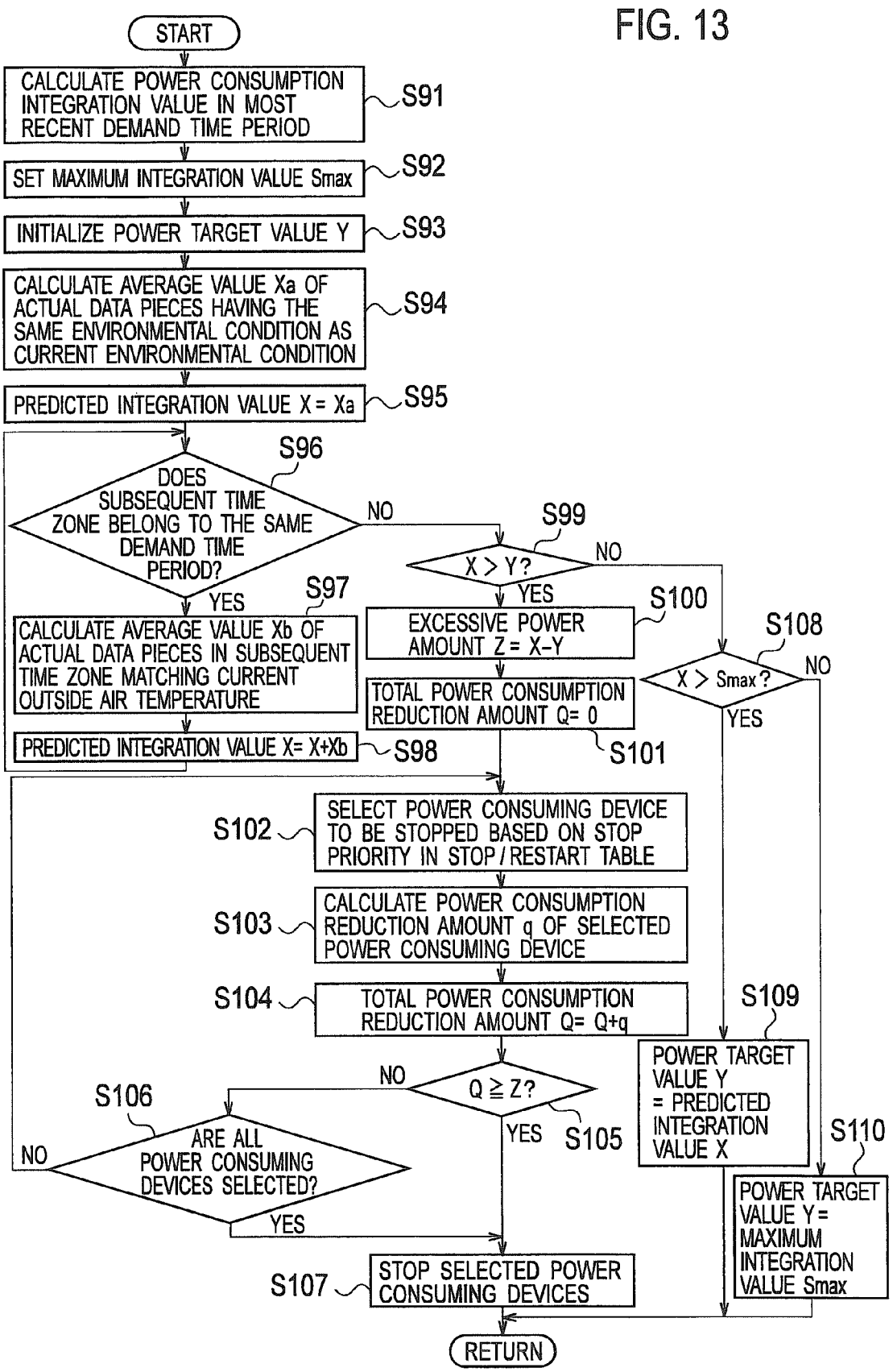
FIG. 13 is a flowchart showing the demand controlling method according to a third second embodiment, which shows details of the prediction control processing (step S11) at the start of the demand time period shown in FIG. 6.

FIG. 13 is a flowchart showing the demand controlling method according to the third embodiment, and illustrates details of the prediction control processing (step S11) shown in FIG. 6, performed at the start of the demand time period. Here, the processing from step S93 to step S107 shown in FIG. 13 is similar to the processing from step S21 to step S35 shown in FIG. 7, and description thereof will be omitted.

First, the CPU 41 calculates the power consumption integration value in the most recent demand time period based on the data stored in the operation state database 46 (step S91). Next, the CPU 41 sets up the maximum integration value Smax (step S92). The maximum integration value Smax is set to "0" in the beginning of the month and is then set to the maximum value among the consumption integration values of power actually consumed in the respective demand time periods in the current month.

Thereafter, the processing goes to the processing from step S93 to step S98, and then to step S99. Then, when a determination is made in step S99 that the predicted integration value X does not exceed the power target value Y (step S99: NO), the CPU 41 determines whether or not the predicted integration value X exceeds the maximum integration value Smax (step S108).

When a determination is made that the predicted integration value X exceeds the maximum integration value Smax (step S108: YES), the CPU 41 changes the power target value Y to the value of the predicted integration value X (step S109) Thereafter, the processing goes to the flowchart shown in FIG. 6. On the other hand, when a determination is made that the predicted integration value X does not exceed the maximum integration value Smax (step s108: NO), the CPU 41 lowers the power target value Y to the maximum integration value Smax (step S110). Thereafter, the processing goes to the flowchart shown in FIG. 6.

As described above, as in the first embodiment, the third embodiment allows improved accuracy of calculating the predicted integration value, optimized power target value, and eventual reduction in the contract rate. Moreover, it is possible to prevent the actual data from being inaccurate and causing degradation in accuracy of calculating the predicted integration value.

Further, according to the third embodiment, the power target value in the current demand time period is changed to the maximum integration value when the predicted integration value is equal to or below the maximum integration value. Since the rate is set up based on the maximum integration value in the demand contract method, the change of the power target value in the current demand time period to the value below the maximum integration value will not result in reduction in the contract rate. However, since the power target value is changed to the maximum integration value, it is possible to prevent the change of the power target value which does not result in reduction in the contract rate. Further, lowering the power target value to the maximum integration value can make it less likely that the maximum integration value Smax is updated in the current month, allowing eventual reduction in the contract rate.

The present invention has been described above based on the embodiments. However, the present invention is not limited to the above-described embodiments, and may be modified within a range not departing from the scope of the present invention. For example, in the above-described embodiments, the power target value is changed in the prediction control processing (step S11) at the start of the demand time period. However, without limitations to the foregoing, it is possible to change the power target value in the prediction control processing (step S13) in the midcourse of the demand time period.

Moreover, in the above embodiments, the case of lowering the power target value as shown in FIG. 5 or FIG. 12 has been described as an example. However, without limitation to the case of lowering the power target value, the power target value may be raised. Further, the case of obtaining the predicted integration value at the start of the demand time period has been mainly described in the flowcharts of the embodiments. However, without limitations to the foregoing, the prediction integrated value may be obtained before the demand time period.

In the above embodiments, the case in which the demand time period is set to 30 minutes has been described as an example. However, the time section is not limited to 30 minutes. For example, the time section may include a time zone (e.g., 12 to 2 o'clock) when the amount of power consumption increases as well as a time zone following that (e.g., 2 to 4 o'clock). Moreover, it is also possible to define any time sections such as time zones in which different electricity rates are applied.

Note that the entire contents of Japanese Patent Application No. 2007-61061 (filed on Mar. 9, 2007) and Japanese Patent Application No. 2007-317609 (filed on Dec. 7, 2007) are incorporated in the description of this application by reference.

INDUSTRIAL APPLICABILITY

The present invention is capable of improving accuracy of calculating a predicted integration value and optimizing a power target value, and is therefore useful in a demand control system that controls power consumption of a power consuming device.

The invention claimed is:

1. A demand control system that controls power consumption of a power consuming device when a predicted integration value of power predicted to be consumed by the power consuming device in a demand time period exceeds a power target value being a target value for power to be consumed in the demand time period, the demand control system comprising:

an actual data storage unit configured to store actual data in a state where the actual data are classified according to environmental conditions, the actual data being based on a consumption integration value of power actually consumed by the power consuming device;

a calculator configured to calculate a predicted integration value predicted to be consumed in a current demand time period, by using the actual data at a start or before the start of the current demand time period, the actual data being based on a current actual environmental condition and extracted from storage contents stored by the actual data storage unit from the actual data storage unit; and a changing unit configured to change the power target value in the current demand time period, based on the predicted integration value calculated by the calculator and on the power target value, wherein the changing unit lowers the power target value from a current value when the predicted integration value calculated by the calculator falls below the power target value, wherein the calculator calculates the predicted integration value in the current demand time period and calculates a predicted integration value in a subsequent demand time period from the actual data extracted from the actual data storage unit based on the current actual environmental condition, and even in a case where the predicted integration value in the current demand time period calculated by the calculator falls below the power target value, the changing unit does not lower the power target value in the current demand time period if the predicted integration value in the subsequent demand time period exceeds the power target value.

2. The demand control system according to claim 1, further comprising a maximum power storage unit configured to store a maximum integration value among the consumption integration values of power actually consumed in respective demand time periods in a current month, wherein in a case where the predicted integration value in the current demand time period calculated by the calculator is equal to or below the power target value, the changing unit changes the power target value in the current demand time period to the predicted integration value if the predicted integration value exceeds the maximum integration value, and changes the power target value in the current demand time period to the maximum integration value if the predicted integration value is equal to or below the maximum integration value.

3. The demand control system according to claim 1, wherein when the consumption integration value of power actually consumed represents power consumed by the power consuming device under the control of the power consumption, the actual data storage unit stores as the actual data an integration value of power supposed to be consumed on the assumption that the power consumption is not controlled.

4. The demand control system according to claim 2, wherein when the consumption integration value of power actually consumed represents power consumed by the power consuming device under the control of the power consumption, the actual data storage unit stores as the actual data an integration value of power supposed to be consumed on the assumption that the power consumption is not controlled.

5. A demand controller that controls power consumption of a power consuming device when a predicted integration value of power predicted to be consumed by the power consuming device in a demand time period exceeds a power target value being a target value for power to be consumed in the demand time period, the demand controller comprising:

an actual data storage unit configured to store actual data in a state where the actual data are classified according to environmental conditions, the actual data being based on a consumption integration value of power actually consumed by the power consuming device;

a calculator configured to calculate a predicted integration value predicted to be consumed in a current demand time period, by using the actual data at a start or before the start of the current demand time period, the actual data being based on a current actual environmental condition and extracted from storage contents stored by the actual data storage unit; and a changing unit configured to change the power target value in the current demand time period, based on the predicted integration value calculated by the calculator and on the power target value, wherein the changing unit lowers the power target value from a current value when the predicted integration value calculated by the calculator falls below the power target value, wherein the calculator calculates the predicted integration value in the current demand time period and calculates a predicted integration value in a subsequent demand time period from the actual data extracted from the actual data storage unit based on the current actual environmental condition, and even in a case where the predicted integration value in the current demand time period calculated by the calculator falls below the power target value, the changing unit does not lower the power target value in the current demand time period if the predicted integration value in the subsequent demand time period exceeds the power target value.

6. A demand controlling method of controlling power consumption control of a power consuming device when a predicted integration value of power predicted to be consumed by the power consuming device in a demand time period exceeds a power target value being a target value for power to be consumed in the demand time period, the demand controlling method comprising:

an actual data storage step of storing, in an actual data storage unit, actual data in a state where the actual data are classified according to environmental conditions, the actual data being based on a consumption integration value of power actually consumed by the power consuming device;

a calculating step of calculating a predicted integration value predicted to be consumed in a current demand time period, by using the actual data at a start or before the start of the current demand time period, the actual data being based on a current actual environmental condition and extracted from storage contents stored in the actual data storage step; and a changing step of changing the power target value in the current demand time period, based on the predicted integration value calculated in the calculating step and on the power target value, wherein the changing step, using a changing unit, lowers the power target value from a current value when the predicted integration value calculated by the calculator falls below the power target value, wherein the calculating step, using a calculator, calculates the predicted integration value in the current demand time period and calculates a predicted integration value in a subsequent demand time period from the actual data extracted from the actual data storage unit based on the current actual environmental condition, and even in a case where the predicted integration value in the current demand time period calculated by the calculator falls below the power target value, the changing unit does not lower the power target value in the current demand time period if the predicted integration value in the subsequent demand time period exceeds the power target value.

* * * * *